United States Patent
Chou

(10) Patent No.: US 6,879,346 B2
(45) Date of Patent: Apr. 12, 2005

(54) DIGITAL CAMERA WITH SPINDLE CAPABLE OF POSITIONING

(75) Inventor: Chih-Rong Chou, Hsinchu (TW)

(73) Assignee: AIPTEK International Inc., Hsinchu (TW)

(*) Notice: Subject to any disclaimer, the term of this patent is extended or adjusted under 35 U.S.C. 154(b) by 640 days.

(21) Appl. No.: 10/053,798

(22) Filed: Jan. 18, 2002

(65) Prior Publication Data

US 2003/0137598 A1 Jul. 24, 2003

(51) Int. Cl.$^7$ ............................................. H04N 5/225
(52) U.S. Cl. ...................... 348/374; 348/552; 348/373
(58) Field of Search ................................ 348/373–376, 348/552; 403/326, 329, 78, 52, 150, 161, 163

(56) References Cited

U.S. PATENT DOCUMENTS

| | | | | |
|---|---|---|---|---|
| 5,708,853 A | * | 1/1998 | Sanemitsu | .................. 348/376 |
| 6,670,985 B2 | * | 12/2003 | Karube et al. | ........... 348/207.1 |
| 6,812,958 B1 | * | 11/2004 | Silvester | ..................... 348/375 |

* cited by examiner

*Primary Examiner*—Tuan Ho
*Assistant Examiner*—Gevell Selby

(57) ABSTRACT

A digital camera with spindle capable of positioning has a spindle composed of a shaft carrier and a shaft sleeve, in which the shaft carrier has two arcuate columns and the shaft sleeve is sleeve-jointed to the shaft carrier. Those two arcuate columns confront against the top rim of the shaft sleeve such that a plurality of projecting dots of the arcuate columns would be snap-engaged in a plurality of corresponding dimples formed in the top rim of the shaft sleeve to thereby achieve angular positioning effect of a lens end in the digital camera.

3 Claims, 4 Drawing Sheets

DIGITAL CAMERA WITH SPINDLE CAPABLE OF POSITIONING

FIELD OF THE INVENTION

This invention relates generally to a digital camera, particularly to a digital camera provided with a spindle capable of positioning.

BACKGROUND OF THE INVENTION

A PDA (personal digital assistant) can be not only an electronic device for data processing but also a display device in the meanwhile for other electronic devices.

As indicated in FIG. 1, a PDA 10 serves as a display device for view finding of a digital camera 11. In the digital camera 11, a spindle 12 is arranged to facilitate view finding in different directions. The digital camera 11 is composed of a lens end 13 and a main body end 14, in which one end of the spindle 12 is fixed to the lens end 13 and the other attached to the main body end 14 such that the lens end 13 is permitted to rotate for view finding freely.

Referring to FIG. 2 this time, a conventional spindle 12 in the digital camera 11 comprises a shaft carrier 15 and a shaft sleeve 16 sleeve-jointed to the shaft carrier 15 such that the spindle 12 can rotate stably by taking advantage of the frictional force in-between. However, the spindle 12 cannot be positioned at where desired, for example, in a direction oriented 45 degrees, and this is the problem pending improvements according to this invention.

SUMMARY OF THE INVENTION

The primary object of this invention is to provide a digital camera with spindle capable of positioning.

In order to realize the object mentioned, a spindle of a digital camera of this invention comprises a shaft carrier and a shaft sleeve, in which the shaft carrier has two arcuate columns and the shaft sleeve is sleeve-jointed to the shaft carrier, wherein those two arcuate columns confront against the top rim of the shaft sleeve such that a plurality of projecting dots of the arcuate columns would be snap-engaged in a plurality of corresponding dimples formed in the top rim of the shaft sleeve to thereby achieve angular positioning effect of a lens end in the digital camera.

For more detailed information regarding advantages or features of this invention, at least an example of preferred embodiment will be fully described below with reference to the annexed drawings.

BRIEF DESCRIPTION OF THE DRAWINGS

The related drawings in connection with the detailed description of this invention to be made later are described briefly as follows, in which.

DETAILED DESCRIPTION OF THE INVENTION

Figure 1:
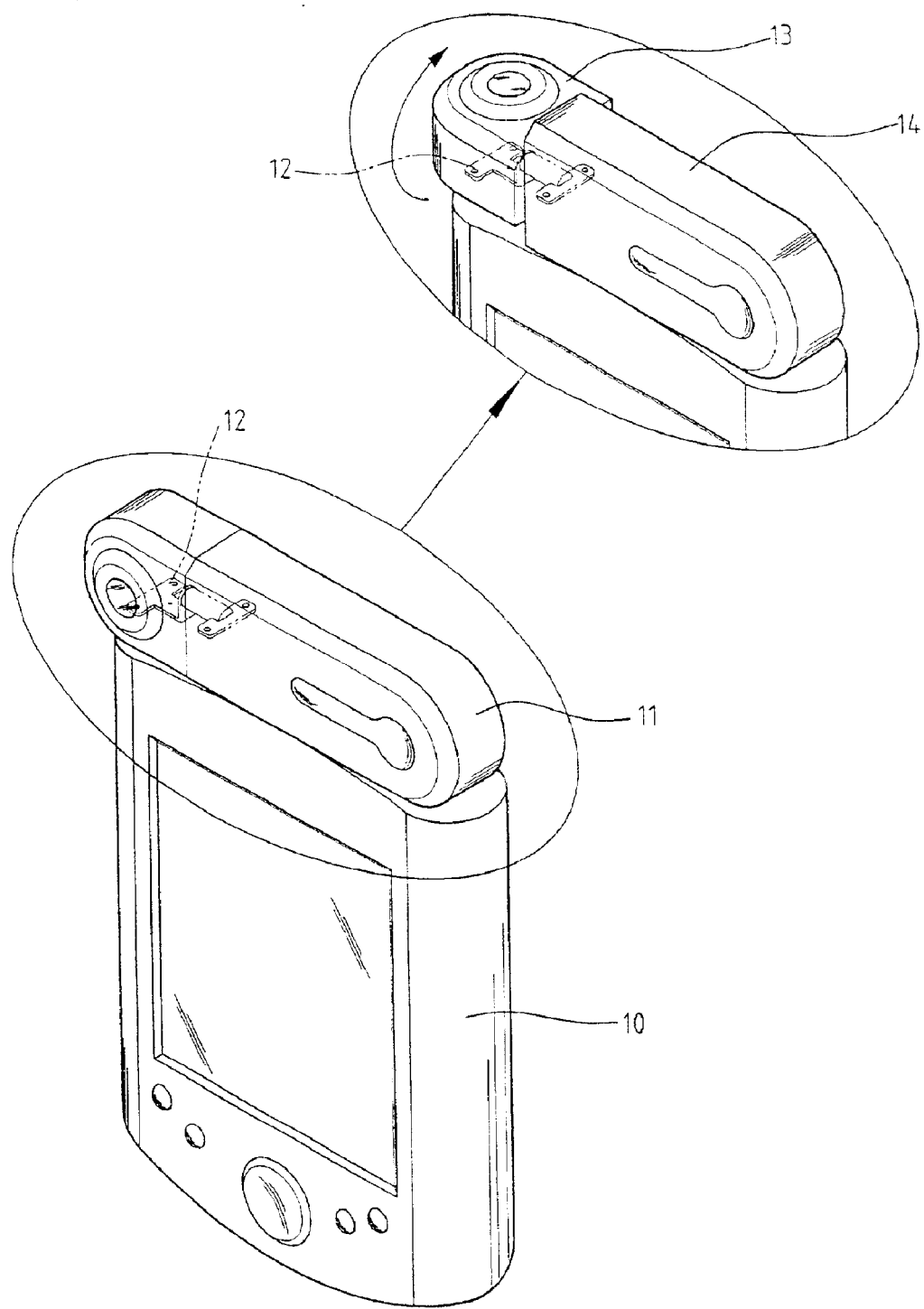
FIG. 1 is a schematic view showing that a PDA serves as a display device of a digital camera for view finding.
Figure 2:
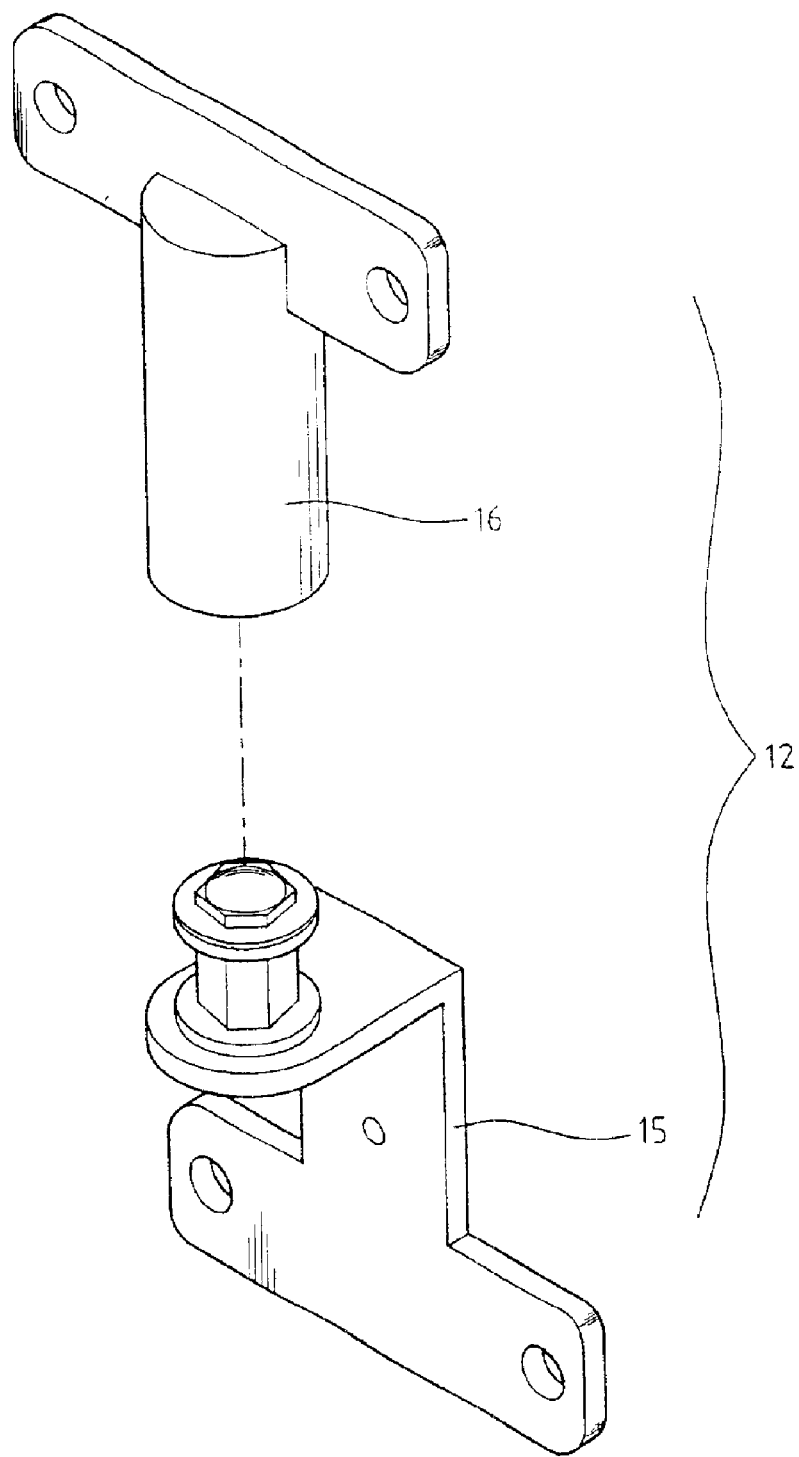
FIG. 2 is a schematic view of a conventional spindle.
Figure 3:
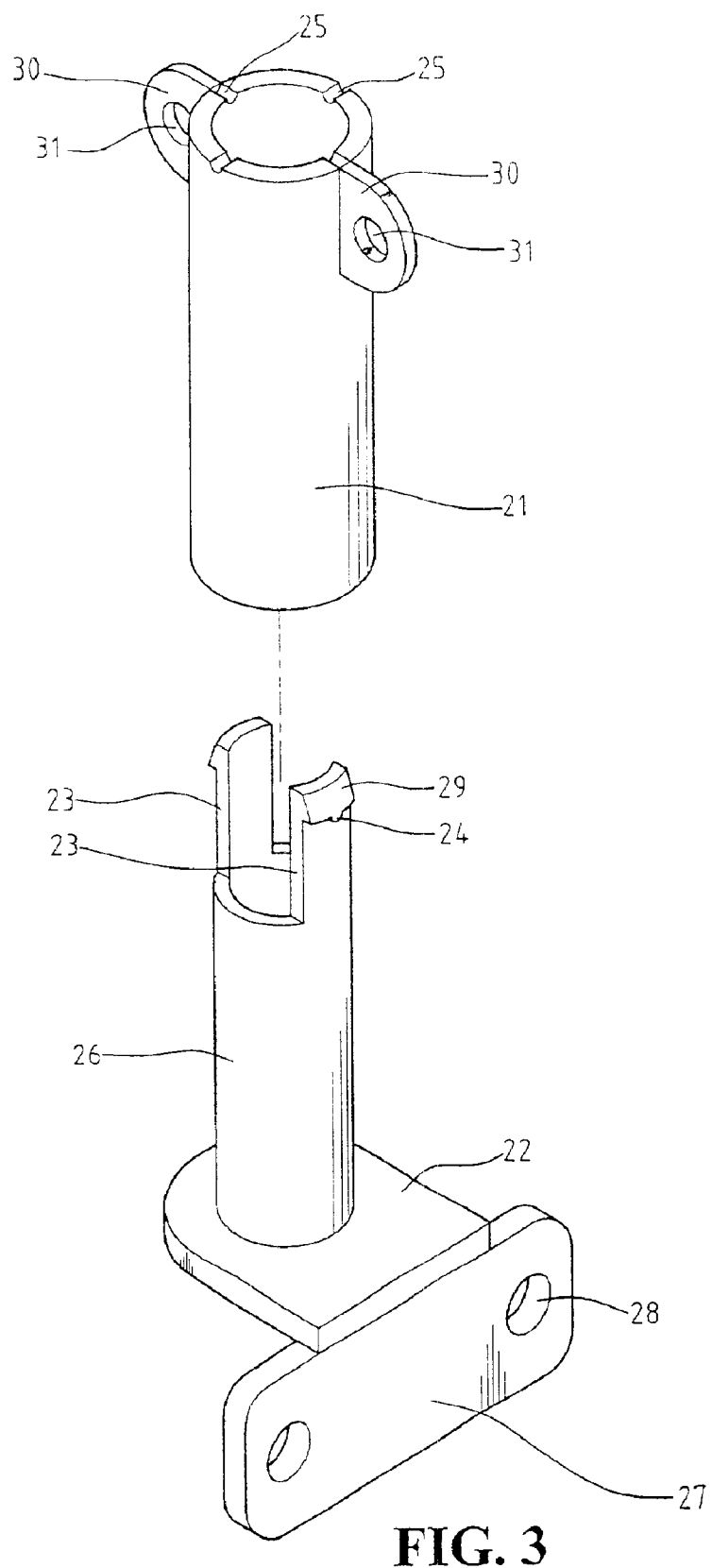
FIG. 3 is a spread view of a spindle of this invention.
Figure 4:
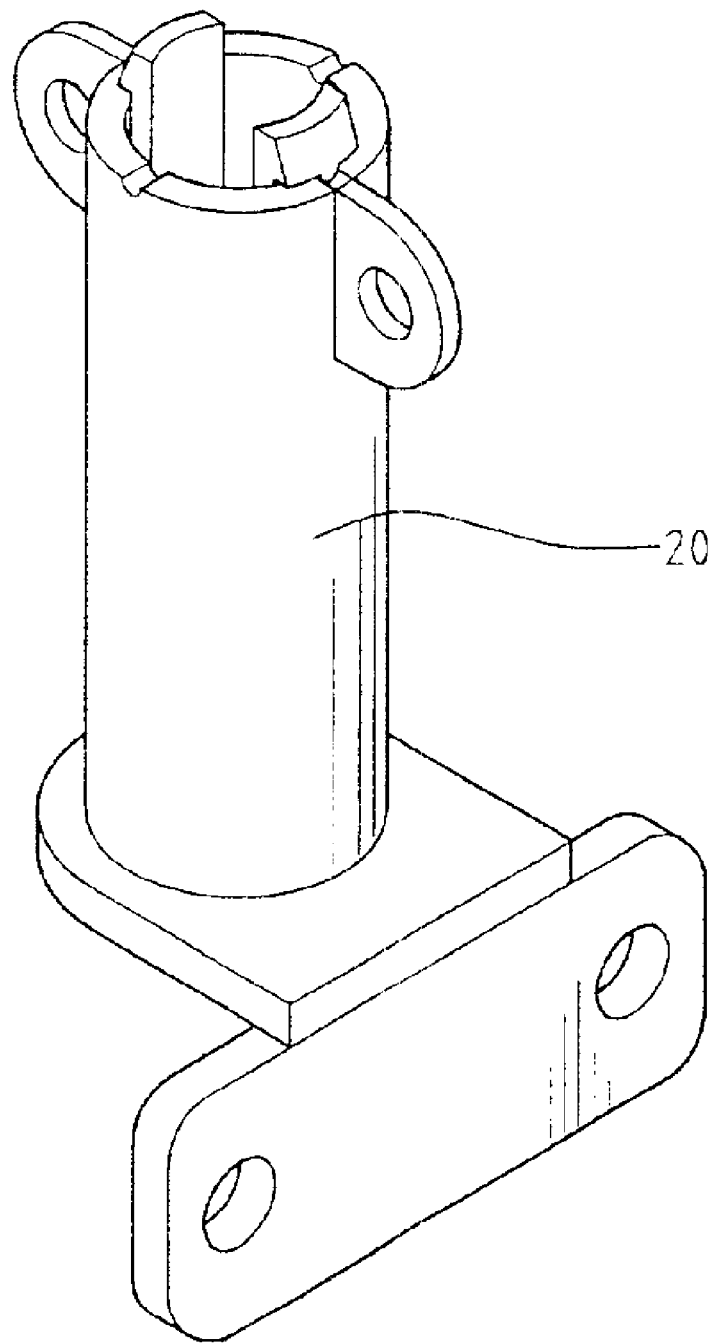
FIG. 4 is a schematic view showing an assembled spindle of this invention.

As illustrated in FIGS. 3 and 4, a spindle 20 of a digital camera of this invention is composed of a shaft sleeve 21 and a shaft carrier 22.

The shaft carrier 22 comprises a rotation post 26 and an ear rack 27, in which the rotation post 26 is substantially a cylinder to be inserted in the shaft sleeve 21; a plurality of set holes 28 is perforated in the ear rack 27 for setting the shaft carrier 22 on the digital camera with locking pieces. The shaft sleeve 21 is in reality a hollow cylinder to be sleeve-jointed with the rotation post 26 and is provided with a pair of lateral ears 30, in which a fixing hole 31 is formed respectively for anchoring the shaft sleeve 21 on the digital camera with locking pieces. A pair of arcuate columns 23 formed in the top end of the rotation post 26 is provided with a protruding rib 29 on their top ends apiece and a projecting dot 24 is resided on each projecting rib 29. When the rotation post 26 is sheathed in the shaft sleeve 21, the protruding ribs 29 confronted against the top rim of the shaft sleeve 21 might be turned to have the projecting dots 24 engaged with corresponding dimples 25 formed on the top rim of the shaft sleeve 21 so that a positioning effect is obtainable. Thus, the spindle 20 might be precisely turned to sweep a predetermined angle, say 15 degrees, should every two contiguous dimples have been spaced in that angle.

By making capital of the tolerance and frictional force between the rotation post 26 and the shaft sleeve 21, the rotation post 26 can be turned stably. Meanwhile, as the shaft sleeve 21 confronts against the arcuate columns 23, an outward reactive force from the arcuate columns 23 is created such that the protruding ribs 29 would apply pressure onto the top rim of the shaft sleeve 21 to have its projecting dots 24 snap-engaged in the dimples 25 of the shaft sleeve 21. In a preferred embodiment of this invention, the spindle 20 is a plastic shaft that can provide a larger deformable allowance with a better positioning effect of a lens end in the digital camera.

In the above described, at least one preferred embodiment has been described in detail with reference to the drawings annexed, and it is apparent that numerous variations or modifications may be made without departing from the true spirit and scope thereof, as set forth in the claims below.

What is claimed is:

1. A digital camera with spindle capable of positioning, in which one end of a spindle is fixed to a lens end and the other attached to a main body end of the digital camera such that the lens end is permitted to rotate for view finding freely, and the spindle comprises:

a shaft sleeve, which is a hollow cylinder, having a plurality of lateral ears with a fixing hole each for setting the shaft sleeve to the digital camera by locking pieces; and a shaft carrier having a rotation post and an ear rack, in which the rotation post is substantially a cylinder to be inserted in the shaft sleeve; a plurality of set holes is perforated in the ear rack for setting the shaft carrier on the digital camera with locking pieces;

in which a pair of arcuate columns is formed in the top end of the rotation post; a protruding rib is arranged on the top end of each arcuate column; a projecting dot is resided on each projecting rib; and a plurality of dimples corresponding to the dots is formed in the top rim of the shaft sleeve such that the projecting dots would be snap-engaged to the corresponding dimples to obtain a positioning effect of the lens end when the rotation post is sheathed and turned in the shaft sleeve.

2. The digital camera according to claim 1, in which the spindle is a plastic shaft.

3. The digital camera according to claim 1 being applicable by combining together with a PDA, which serves for a display device of the digital camera.

* * * * *